March 19, 1963  J. R. TURK  3,082,338
ROTOR ASSEMBLY FOR DYNAMOELECTRIC MACHINE
Filed March 6, 1961
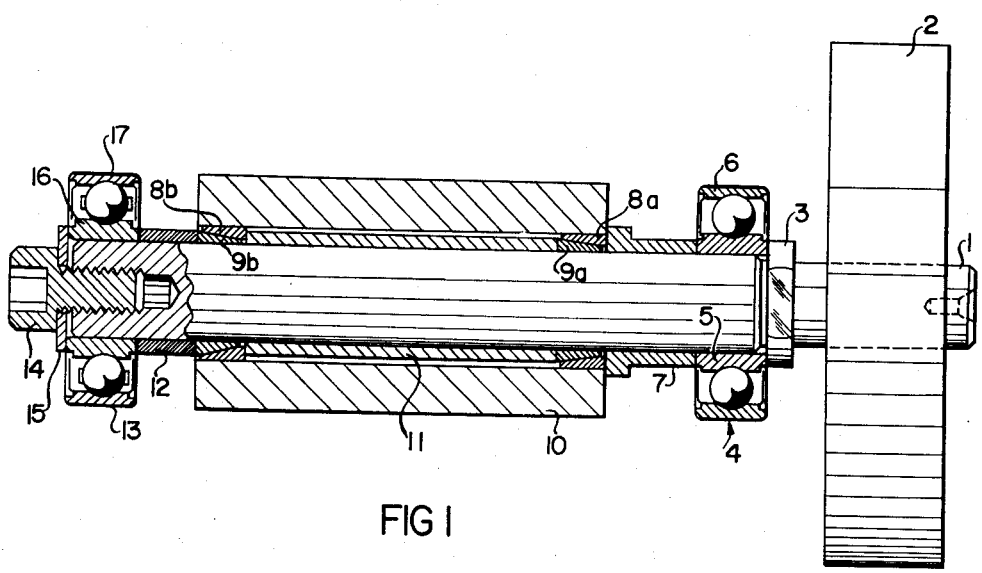
FIG I
INVENTOR.
JAMES R. TURK
BY
Oberlin, Maky & Donnelly
ATTORNEYS

United States Patent Office 3,082,338
Patented Mar. 19, 1963

3,082,338
ROTOR ASSEMBLY FOR DYNAMOELECTRIC
MACHINE
James R. Turk, Euclid, Ohio, assignor to
Vincent K. Smith, Gates Mills, Ohio
Filed Mar. 6, 1961, Ser. No. 93,445
4 Claims. (Cl. 310—261)

This invention relates generally as indicated to a rotor assembly for a dynamoelectric machine, and more particularly to a rotor assembly for a fractional horsepower electric motor.

Many different types of rotors for dynamoelectric machines are known in the art varying in construction according to the type of motor. These rotors may be of the wire-wound type, squirrel-cage type, etc., or they may simply comprise a laminated shell or single shell of high hysteretic material as in the case of hysteresis motors. Frequently, the rotor may have a load member of some type more or less permanently fixed to one end of the rotor shaft which prevents access to the rotor bearings from that end. Although modern high-precision, anti-friction bearings eliminate the need for their replacement in many general purpose motors, this is not always the case. For example, in television recording devices a precision magnetic drum is shrunk fit onto the rotor shaft of a hysteresis motor. The rotor bearings for such application must meet rigid specifications and even the slightest deviations will result in an undesirable beat frequency in the operation of the drum. Accordingly, it may be necessary to assemble and disassemble the rotor bearings one or more times before perfect ones are found. With known rotors having load members permanently secured thereto it is difficult, if not impossible, to so interchange rotor bearings.

It is therefore an object of this invention to provide a rotor assembly that is easily disassembled.

It is a further object to provide a rotor assembly having a permanent load member on one end of the rotor shaft, which is easily disassembled from the other end to provide access to the bearing between said load member and the rotor assembly.

It is another object to provide such a rotor assembly wherein both bearing assemblies thereon are easily removable and replacement of the bearings is easily accomplished.

Yet another object is to provide such a rotor assembly in which the rotor sleeve is held rigidly in place while in operation.

A still further object is to provide such an assembly which eliminates eccentric members such as slot keys, splines, etc., so as to reduce the adverse effects on the rotational characteristics of the load.

Other objects and advantages of the present invention will become apparent as the following description proceeds.

To the accomplishment of the foregoing and related ends, the invention, then comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

These and other objects are accomplished by the instant invention which, briefly stated, is a rotor assembly for a dynamoelectric machine comprising a rotor shaft, a rotor sleeve mounted thereon, two pairs of axially tapered, mated rings, each pair of said rings mounted on said shaft at the ends of said rotor sleeve with their tapered, mated surfaces in contact and with the interior surface of one ring in contact with said shaft and the exterior surface of the other ring in contact with the interior surface of said rotor sleeve, and means for applying axial force to said pairs of rings to grip said rotor sleeve firmly to said shaft.

The term "rotor sleeve" is used herein generically and is the central cylindrical member which is located within a stator between the rotor bearings on the rotor shaft. In the case of a wound rotor motor the term includes the assembly wherein rotor windings consist of wire wound on a stack of laminated spiders. This latter assembly has a cylindrical core which fits around the rotor shaft. The term also includes a cylindrical assembly, as in a squirrel-cage rotor, wherein bars or conductors are disposed in the surface of the cylinder in an axial direction (straight or skewed). In the preferred embodiment of this invention the term refers to a cylinder or tube of a high hysteretic material such as of chromium or cobalt steel. It is only vital to this invention that this "rotor sleeve" be cylindrical in shape and have a cylindrical core sufficiently greater than the rotor shaft in diameter to accommodate a pair of axially tapered mated rings within its ends.

The invention will now be described in reference to the attached drawing wherein the single FIGURE is a central longitudinal cross-section view of a rotor assembly constituting the present invention, the load member attached on the rotor shaft being shown in elevation.

Referring now more particularly to the drawing, the rotor shaft 1, which is suitably made of stainless steel or cold-rolled steel, has a load member 2 fixedly attached to one end. In the drawing this load member 2 is shown as a magnetic recording drum but within the scope of this invention can be any member driven by the rotor. If this member is shrunk-fit onto the shaft 1 it will be difficult, if not impossible to remove, and it is then that the advantages of this invention will be most fully realized. Keeper-ring 3 is either integral with the shaft 1 or is so attached to the shaft 1 as to prevent its movement in the axial direction. The first bearing assembly 4 is mounted on the shaft 1 adjacent the keeper-ring 3 in such a manner that its inner race 5 is a wringing fit on the shaft 1 and, of course, the outer race 6 will have a similar close fit in the interior surface of the stator assembly (not shown). Compression sleeve 7 (preferably, a brass spacer) has a slip fit on the shaft 1 adjacent the bearing assembly 4.

Next, a pair of precision axially tapered, mated rings 8a and 9a are mounted on the shaft 1 adjacent compression sleeve 7. Ring 9a has its interior surface in slip fit contact with shaft 1 while ring 8a has its interior tapered surface in contact with the exterior tapered surface of ring 9a. These rings 8a and 9a are suitably made of aluminum, brass, or like material. Rotor sleeve 10 is mounted on the shaft 1, and for a hysteresis motor said sleeve is made of high hysteretic material. The bore of the rotor sleeve 10 is greater than the outside diameter of the shaft 1. The interior surface of one end of the rotor sleeve 10 is in close slip fit contact with the exterior surface of ring 8a. The ends of the ring 8a and the rotor sleeve 10 abut the end of compression sleeve 7. A brass or like compression sleeve 11 is mounted on the shaft 1 in a slip fit and is disposed in the annular space between the shaft 1 and the bore of the rotor sleeve 10, one end adjacent to the end of ring 9a. Next, another pair of axially tapered mated rings 8b and 9b are mounted on the shaft 1, these rings being identical to rings 8a and 9a and mounted in the same manner. One end of ring 8b abuts compression sleeve 11. Another brass or like compression sleeve 12 is mounted on the rotor shaft 1 in a slip fit, one end of which is adjacent to ring 9b. A bearing assembly 13 identical to bearing assembly 4 is mounted on the shaft 1 with a wringing fit adjacent to compression sleeve 12. The lengths of the various members assembled have been so selected that the axial end of bearing assembly 13 extends slightly beyond the end of shaft 1. The latter end of shaft 1 is internally threaded for screw-threaded engagement with a socket-head cap screw 14. The head of screw 14 bears on a washer 15 which is sufficient in diameter to abut the inner race 16 of bearing assembly 13. The outer race 17, like outer race 6, is adapted to have a close fit in the interior of the stator assembly (not shown). Thus, when the screw 14 is tightened the entire rotor assembly is held in compression between keeper-ring 3 and washer 15. The compression sleeves 7, 11, and 12 act on the ends of the rings 8a, 9a, 8b, and 9b so as to firmly hold the rotor sleeve 8 in place. Such axial compression forces on the ends of the respective pairs of rings 8a; 9a and 8b; 9b are effective to cause resilient radial contraction of the inner rings 9a and 9b into tight frictional engagement on the rotor shaft 1 and resilient radial expansion of the outer rings 8a and 8b into tight frictional engagement in the bore of the rotor sleeve 10. When the screw 14 is removed, the bearing 13 and compression sleeve 12 may be removed from that end of the rotor shaft 1, and the remaining parts likewise may be removed because the release of axial compression forces on the rings 8a; 9a and 8b; 9b permits them to spring back to their original close fits on the shaft 1 and in rotor sleeve 10.

Preferably, the socket head cap screw 14 has a portion of its threaded surface made of nylon or other plastic. The latter portion exerts sufficient frictional force against the threads of the shaft 1 to lock the screw in place and prevent loosening of the parts of the rotor assembly during operation.

The rotor assembly of this invention is capable of quick and simple disassembly. As indicated previously this facility may be desirable when bearings must be changed on a rotor shaft having a member permanently fixed to one end. This invention further provides a rotor assembly wherein the rotor sleeve may be changed, thus the motor characteristics may be varied quickly and easily as desired merely by replacing the rotor sleeve. For example, in a hysteresis motor one sleeve of high hysteretic material may be conveniently replaced by another of a different material or of different construction. If desired, a solid tube rotor sleeve may be replaced by a wire-wound sleeve or even a squirrel-cage rotor sleeve. The versatility of such a rotor construction is highly desired, particularly in the manufacture of high-precision, specialty motors.

Other modes of applying the principle of the invention may be employed, change being made as regards the details described, provided the features stated in any of the following claims, or the equivalent of such be employed.

I therefore particularly point out and distinctly claim as my invention:

1. A rotor assembly for a dynamoelectric machine comprising a rotor shaft, a load member fixedly attached to one end of said shaft, a rotor sleeve mounted on said shaft, a first bearing assembly removably mounted against a shoulder on said shaft between said load member and said rotor sleeve, two pairs of axially tapered, mated rings, each pair of said rings mounted on said shaft at the ends of said rotor sleeve with their tapered, mated surfaces in contact and with the interior cylindrical surface of one ring in contact with said shaft and the exterior cylindrical surface of the other ring in contact with the interior surface of said rotor sleeve, a compression sleeve slidably mounted on said shaft and within said rotor sleeve between and adjacent to said pairs of rings, a second bearing assembly closely slidably mounted on the other end of said rotor shaft, and means for applying axial force to said second bearing assembly holding said rotor assembly in compression against said shoulder and effecting radial expansion and radial contraction of said rings into frictional engagement with said rotor sleeve and said rotor shaft respectively, such frictional engagement constituting the sole means of holding said rotor sleeve and rotor shaft together for rotation in unison.

2. A rotor assembly for a dynamoelectric machine comprising a rotor shaft having a load member fixedly attached to one end of said shaft, a fixed keeper ring attached to the load end of the shaft, a first bearing assembly closely slidably mounted on said shaft adjacent said keeper ring, a rotor sleeve mounted on said shaft with two pairs of axially tapered, mated rings, each pair of said rings mounted on said shaft at the ends of said rotor sleeve with their tapered, mated surfaces in contact and with the interior cylindrical surface of one ring in contact with said shaft and the exterior cylindrical surface of the other ring in contact with the interior surface of said rotor sleeve, a first compression sleeve slidably mounted on said shaft, one end adjacent said first bearing assembly and the other end adjacent one pair of said mated rings, a second compression sleeve slidably mounted on said shaft and within said rotor sleeve between and adjacent to said pairs of rings, a third compression sleeve slidably mounted on said shaft adjacent the second pair of said mated rings, a second bearing assembly closely slidably mounted on said shaft adjacent said third compression sleeve, and means for adjustably applying axial pressure to said second bearing assembly holding said rotor assembly in compression against said fixed keeper ring and effecting radial expansion and radial contraction of said rings into frictional engagement with said rotor sleeve and said rotor shaft respectively, such frictional engagement constituting the sole means of holding said rotor sleeve and rotor shaft together for rotation in unison.

3. The rotor assembly according to claim 2 wherein said means for applying axial pressure comprises a screw axially, threadably engaged in the end of said shaft opposite to said load end, and a washer on said screw in contact with said second bearing assembly.

4. The rotor assembly according to claim 2 wherein said first compression sleeve and said rotor sleeve have radially overlapped and abutting surfaces to axially locate said rotor sleeve on said rotor shaft.

References Cited in the file of this patent

UNITED STATES PATENTS

| | | |
|---|---|---|
| 2,503,346 | Merredith | Apr. 11, 1950 |
| 2,623,188 | LeTourneau et al. | Dec. 23, 1952 |